United States Patent
Belloso (12)

(10) Patent No.: US 6,581,536 B1
(45) Date of Patent: Jun. 24, 2003

(54) SURFACE EFFECT WATERCRAFT HAVING AIRFOIL-AUGMENTED LIFT

(76) Inventor: Gregorio M. Belloso, 5302 Chinaberry Dr., Salisbury, MD (US) 21801

( * ) Notice: Subject to any disclaimer, the term of this patent is extended or adjusted under 35 U.S.C. 154(b) by 0 days.

(21) Appl. No.: 10/098,030

(22) Filed: Mar. 15, 2002

(51) Int. Cl.$^7$ ................................................. B63B 1/00
(52) U.S. Cl. ........................ 114/61.1; 114/274; 440/37
(58) Field of Search ............................ 114/61.1, 144 R, 114/274; 440/37

(56) References Cited

U.S. PATENT DOCUMENTS

| | | | |
|---|---|---|---|
| 2,271,277 A | * | 1/1942 | Roscher .................. 114/271 |
| 3,390,655 A | | 7/1968 | Quady et al. |
| 3,500,784 A | | 3/1970 | Reynolds |
| 3,602,179 A | | 8/1971 | Cole |
| 3,830,179 A | | 8/1974 | Lippisch |
| 3,840,199 A | * | 10/1974 | Tibbs .................... 244/207 |
| 4,407,215 A | | 10/1983 | Cyr |
| 4,705,234 A | * | 11/1987 | Bourn ................... 244/12.1 |
| 4,913,375 A | | 4/1990 | Fitzpatrick |
| 5,082,465 A | * | 1/1992 | Wine ....................... 440/37 |
| 5,458,078 A | | 10/1995 | Perette |
| 5,464,069 A | | 11/1995 | Gifford |
| 5,570,649 A | | 11/1996 | Austin |
| 5,611,294 A | | 3/1997 | Burg |
| 5,655,473 A | | 8/1997 | Arvilla |
| 5,727,495 A | | 3/1998 | Reslein |
| 5,860,380 A | | 1/1999 | Burg |
| 5,860,383 A | | 1/1999 | Whitener |
| 6,148,757 A | | 11/2000 | Schulte |
| 6,216,622 B1 | | 4/2001 | Lindstrom et al. |

* cited by examiner

Primary Examiner—Stephen Avila
(74) Attorney, Agent, or Firm—Norman B. Rainer

(57) ABSTRACT

A multi-hulled watercraft adapted to travel above the surface of a body of water includes deck structure disposed between the hulls and defining with the hulls and water surface a channel through which air is compressively funneled with forward travel of the watercraft. The deck structure includes a bridge component having an airplane wing airfoil configuration. At least one air-moving propulsion unit is mounted on the deck structure at an elevation such that its thrust axis is above the bridge component. Elevon and rudder components located at the rear of the watercraft control the movement of the watercraft when airborne and when riding on the surface of the water. During forward travel, lift is imparted to the watercraft by the combined effects of the channelled air flow beneath the deck structure, and the airfoil configuration of the bridge component. Stability of the watercraft when airborne is achieved by virtue of the location of the thrust axis of the propulsion unit and other features of construction.

9 Claims, 9 Drawing Sheets

SURFACE EFFECT WATERCRAFT HAVING AIRFOIL-AUGMENTED LIFT

BACKGROUND OF THE INVENTION

1. Field of the Invention

This invention relates to watercraft having two or more parallel hulls spanned by overlying deck structure and whose weight is supported in part by the surface effect of air funneled between said hulls as the watercraft moves forwardly above the surface of a body of water.

2. Description of the Prior Art

"Air boats" have long been used for travel upon swamps and other shallow bodies of water. Such boats are generally catamarans having two hulls or pontoons, and equipped with aircraft type propulsion means such as an air fan propeller or jet engine located on the deck of the boat. Such design enables the air boat to function in shallow waters which would not be navigable by a vessel having a conventional immersed propeller. Examples of air boats, as described in U.S. Pat. Nos. 3,500,784; 6,148,757 further disclose the feature of capturing air between the hulls, thereby reducing the frictional drag of the water upon the boat.

Other types of air-driven vehicles include aerodynamic surface effect vessels which, with forward motion produced by aircraft type engine means, develops a ram air lifting force. Such lifting force is generally accomplished by virtue of a high velocity airstream funneled and compressed within the channel defined by the hulls, the deck and water surface. The surface effect lifting principle is capable of raising a vessel one or more feet above an underlying substantially flat surface such as the surface of a body of calm water.

An example of a vehicle employing said aerodynamic surface effect is described in U.S. Pat. No. 3,830,179 to Lippisch which concerns a vehicle for flying in close proximity to a water surface, or flat land. The Lippisch vehicle has a tail that includes a rudder as may be found on conventional aircraft, but no horizontal stabilizer as may be found at the tail of a conventional aircraft.

U.S. Pat. No. 5,464,069 to Gifford describes an air-driven vehicle which employs an aerodynamic surface effect lifting principle augmented by another lifting principle known as the hovercraft effect. In said hovercraft effect, powerful fans produce an air cushion beneath the vehicle without the necessity of forward motion, causing the vehicle to lift about an inch above a flat surface. Because the hovering capacity requires considerable fuel consumption and heavy equipment, load carrying capacity and operational range are sacrificed.

U.S. Pat. No. 3,390,655 to Quady et. al. is another form of hybrid vehicle which relies upon powerful fan jet engines to produce thrust for forward motion and, in hovercraft mode, relies upon the downwardly directed exhaust from those engines to produce an effective air cushion beneath the vehicle. The vehicle includes a tail assembly essentially like that of a conventional aircraft for steering and elevational control.

U.S. Pat. No. 5,727,495 to Reslein concerns an air propeller-driven vehicle employing an aerodynamic surface effect augmented by yet another lifting principle, namely an airfoil or wing as employed in conventional aircraft. The Reslein vehicle includes rearwardly disposed vertical air rudders for turning control, and an elevator flap mounted across the trailing edge of the airfoil for controlling the vehicle's angle of attack in air. Although the Reslein design provides considerable lift capability, the stability of the vehicle when airborne is compromised in view of its high center of gravity, and particularly because its airfoil is positioned above the propeller.

It is accordingly an object of the present invention to provide a watercraft adapted to travel above the surface of a body of water by virtue of lift provided by an aerodynamic surface effect augmented by an airfoil effect.

It is another object of this invention to provide a watercraft as in the foregoing object having improved stability when airborne.

It is a further object of the present invention to provide a watercraft of the aforesaid nature having a multi-hulled construction and having better fuel efficiency and faster speed than conventional multi-hulled watercraft.

It is a still further object of this invention to provide a watercraft of the aforesaid nature which is propelled by aircraft-type propulsion means.

These objects and other objects and advantages of the invention will be apparent from the following description.

SUMMARY OF THE INVENTION

The above and other beneficial objects and advantages are accomplished in accordance with the present invention by an air-driven multi-hulled watercraft adapted to travel above the surface of a body of water in close proximity to said water surface, said watercraft having a vertical center plane of symmetry disposed upon a longitudinal axis extending between front and rear extremities of the watercraft and further comprising:

a) at least two identical elongated hulls equally spaced apart in parallel relationship about said plane of symmetry and adapted to buoyantly support said watercraft when at rest upon said water surface, b) deck structure disposed between and secured to said hulls and defining with said hulls and water surface a channel through which air is compressively funneled with forward travel of said watercraft, c) a bridge component incorporated into said deck structure and bounded in part by upper and lower surfaces and leading and trailing extremities, said bridge component having an airplane wing airfoil configuration, d) an elongated fuselage centered within said deck structure and extending between forward and rearward extremities, e) air-moving propulsion means associated with said deck structure behind said fuselage and having a thrust axis disposed above the upper surface of said bridge component, f) elevons movably attached to the trailing extremity of said bridge component for elevational control of the front extremity of the watercraft, and g) rudder means associated with the rear extremity of said watercraft for providing steering control of the watercraft when airborne and also when floating upon the water surface, whereby h) forward motion produced by said propulsion means causes said watercraft to become airborne above the surface of a body of water by virtue of both the aerodynamic surface effect produced by air passage through said channel and by the lifting effect produced by the airfoil-shaped bridge component, said watercraft having stability in said airborne state by virtue of the critically selected features of construction and the controlling effects of said elevons and rudder means.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
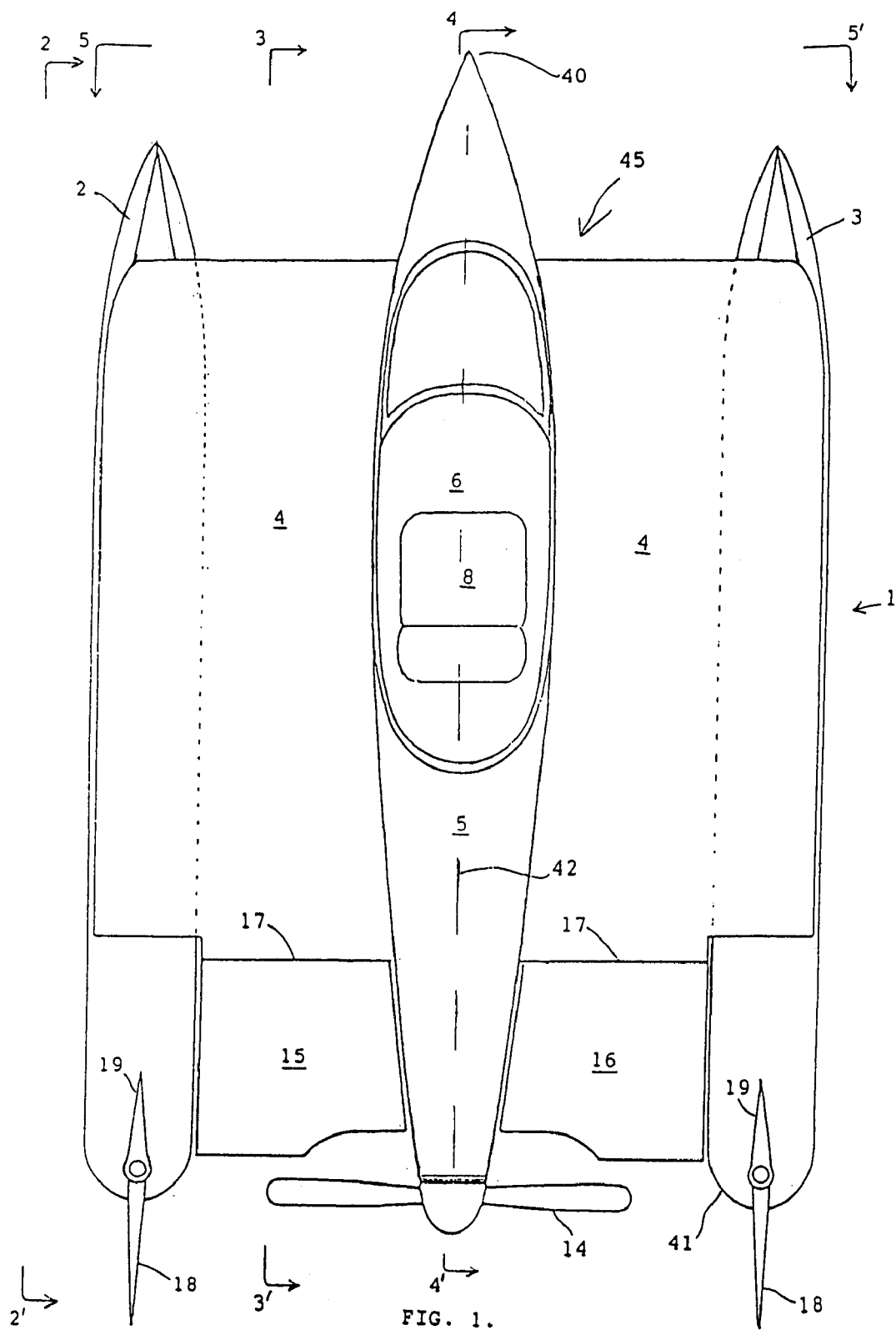
FIG. 1 is a top view of a catamaran embodiment of the watercraft of the present invention.
Figure 2:
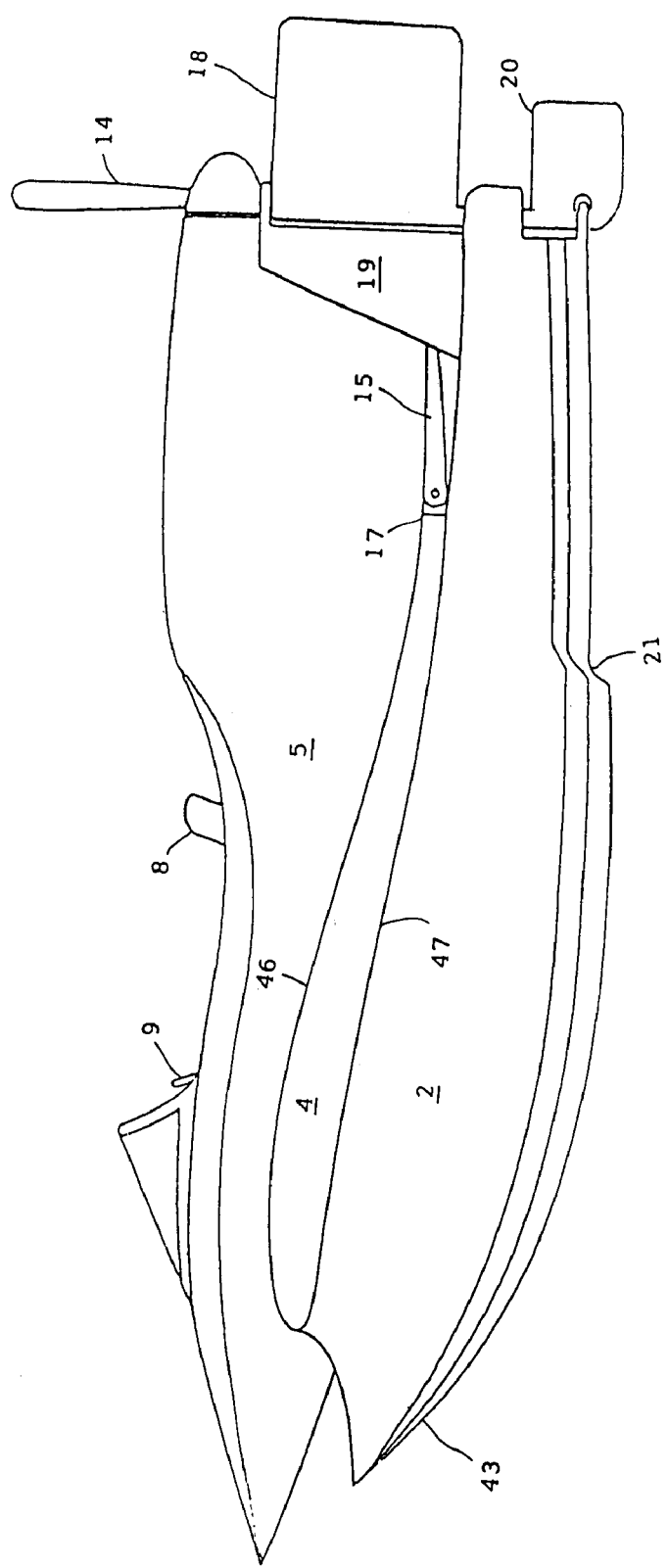
FIG. 2 is a left side view along line 2–2' of FIG. 1.
Figure 3:
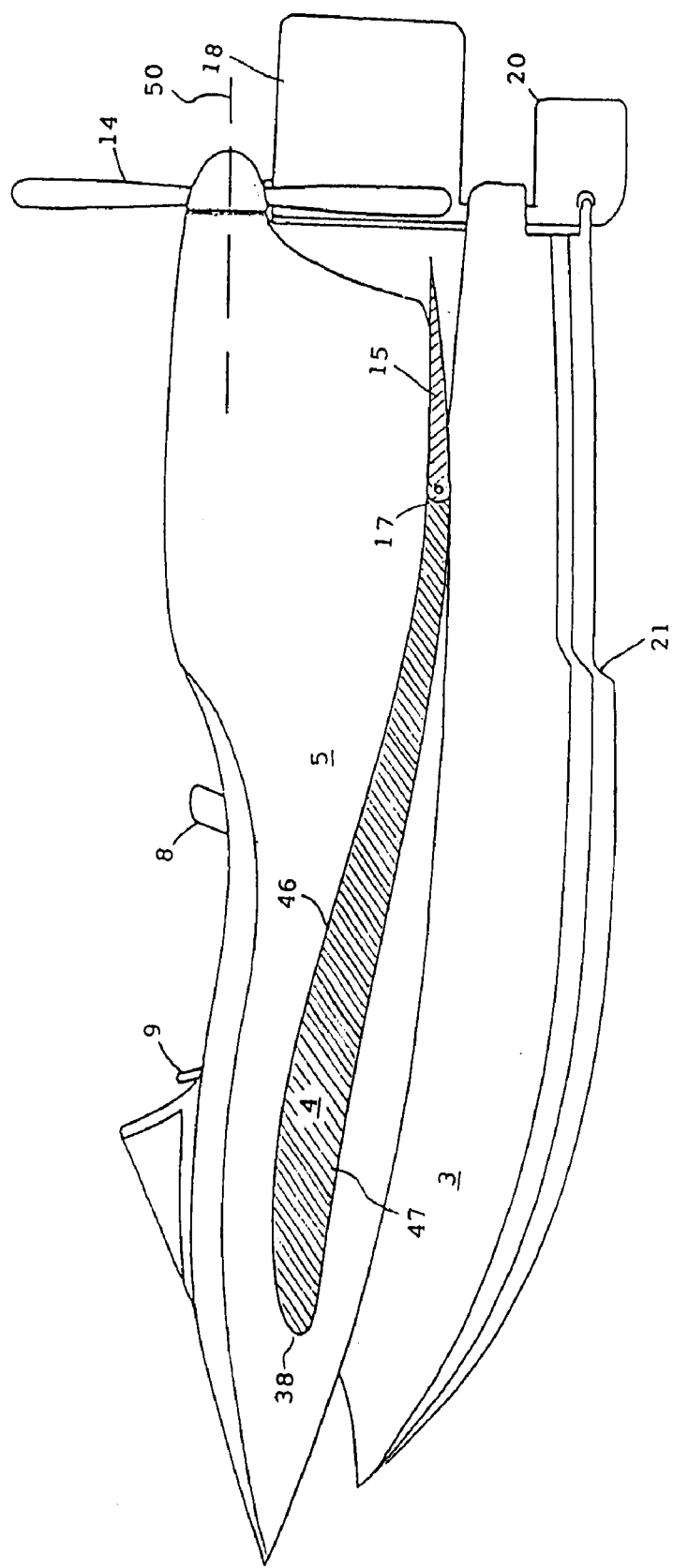
FIG. 3 is a sectional view taken in the direction of the arrows upon line 3–3' of FIG. 1.
Figure 4:
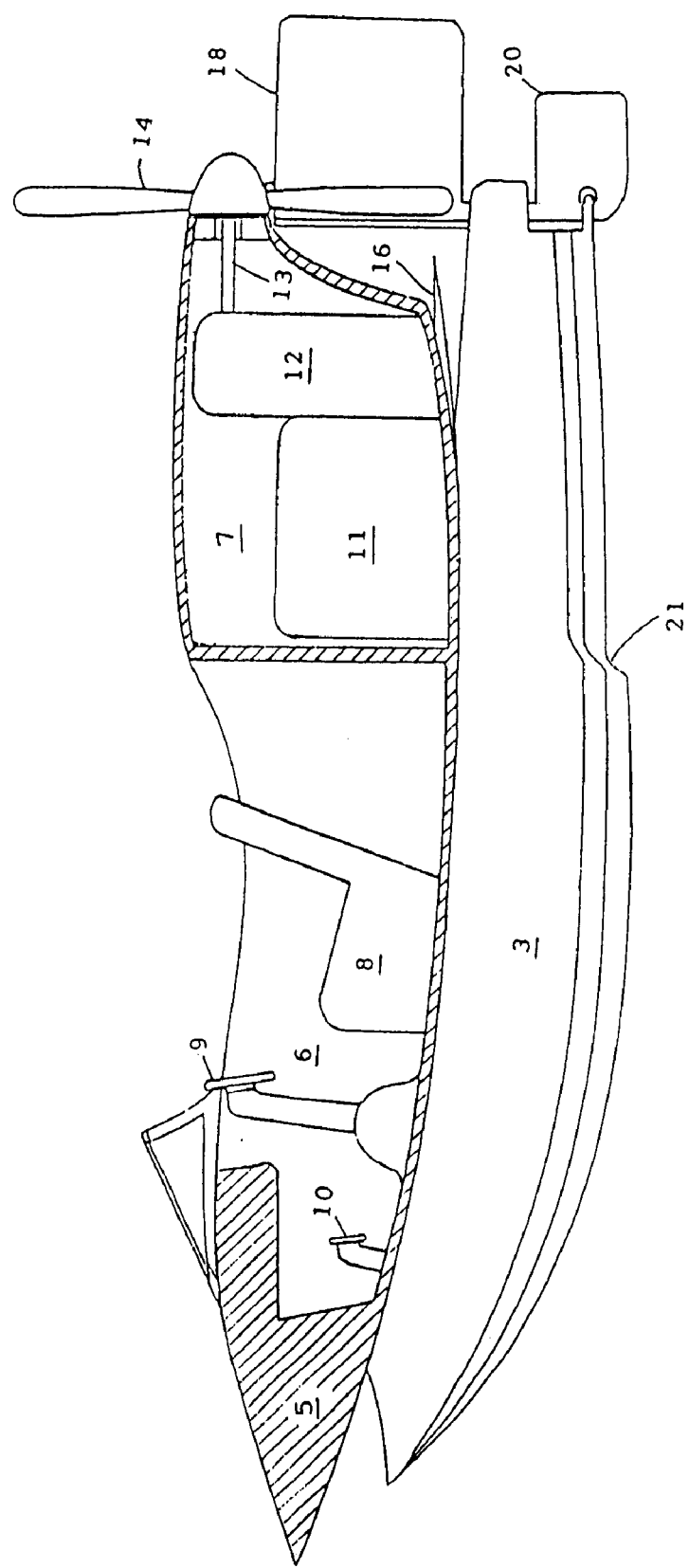
FIG. 4 is a sectional view taken in the direction of the arrows upon 4–4' of FIG. 1.
Figure 5:
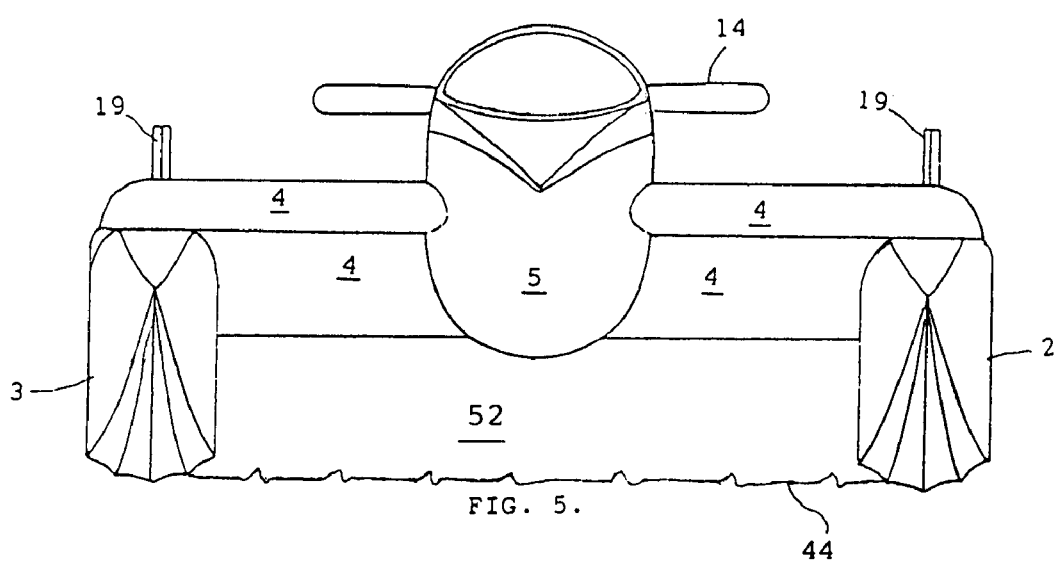
FIG. 5 is a front view along line 5–5' of FIG. 1.

Referring now to FIGS. 1–5, a catamaran embodiment of the watercraft 1 of this invention is shown extending between front and rear extremities 40 and 41, respectively, upon vertical center plane of symmetry 42.

Identical left and right hulls 2 and 3, respectively, are equally spaced apart in parallel relationship about plane 42 and are adapted to buoyantly support said watercraft when at rest upon said water surface. The hulls may be of plastic or metal construction, and are preferably filled with a closed cell rigid foam polymer. The front extremities 43 of said hulls are preferably upwardly contoured so as to present a streamlined interception of the surface of a body of water 44. To facilitate takeoff, the hulls 2 and 3 are preferably designed as "planing hulls" and equipped with a "step" 21 similar to the hull and pontoons of seaplanes.

A deck structure 45 is disposed between and secured to said hulls, and defines with said hulls and water surface a channel 52 through which air is compressively funneled with forward travel of the watercraft.

A bridge component comprised of paired bridge members 4 is incorporated into said deck structure, each bridge member bounded in part by upper and lower surfaces 46 and 47, respectively, and leading and trailing extremities 38 and 17, respectively. Said bridge members, in vertical sectional view, have the configuration of an airplane wing airfoil wherein air flowing across the wing produces a low pressure zone at said upper surface, thus producing a lifting effect. In preferred embodiments, leading extremity 38 is positioned higher than trailing extremity 17 so as to give said bridge members a suitable angle of attack for enhancing the lift effect. Said trailing extremity preferably has a slight gradual upward curvature. Such upwardly reflexed configuration has been found to give improved airborne stability and pitch control.

An elongated fuselage 5 is centered within said deck structure between said bridge members, and extends between forward and rearward extremities 48 and 49, respectively. Fuselage 5 houses passenger compartment 6 and engine compartment 7. Within passenger compartment 6 are the pilot's seat 8, the steering wheel 9 and rudder pedals 10. Within engine compartment 7 are the engine 11, transmission means assembly 12 and shaft 13 which drives rearwardly located air-moving propulsion means, shown as propeller 14. The thrust axis 50 of propeller 14 is located above upper surfaces 46 of said bridge members. In other embodiments, the propulsion means may be a jet engine.

Left elevon 15 and right elevon 16 are movably attached to the trailing extremities 17 of said bridge members. Elevons 15 and 16 combine the functions of elevators and ailerons and are manipulated in the conventional manner through aircraft type steering wheel 9. As in conventional aircraft, when steering wheel 9 is pushed forward elevons 15 and 16 swivel downwards causing the craft to nose down, and when steering wheel 9 is pulled rearward elevons 15 and 16 swivel upwards causing the vehicle to nose up. When steering wheel 9 is turned counterclockwise to the left elevon 15 moves up and elevon 16 moves down, causing the vehicle to roll to the left; conversely when steering wheel 9 is turned to the right (clockwise) elevon 15 moves downwards and elevon 16 moves upwards, causing the craft to roll to the right. The rudder pedals 10 also function like conventional aircraft pedals so that when the right side of pedal 10 is depressed, the air rudders 18 swivel to the right, causing the vehicle to turn to the right, and when the left side of pedal 10 is depressed, the air rudders 18 swivel to the left causing the vehicle to turn left. The air rudders are movably attached to the rear ends of hulls 2 and 3, and are further supported by tail fins 19. Water rudders 20 move with air rudders 18 and provide directional control while the vehicle is operating on the water. For improved operational capability, propeller 14 may be of the type.having variable and reversible pitch to provide braking action and reverse-motion while the vehicle is on the water.

Figure 6:
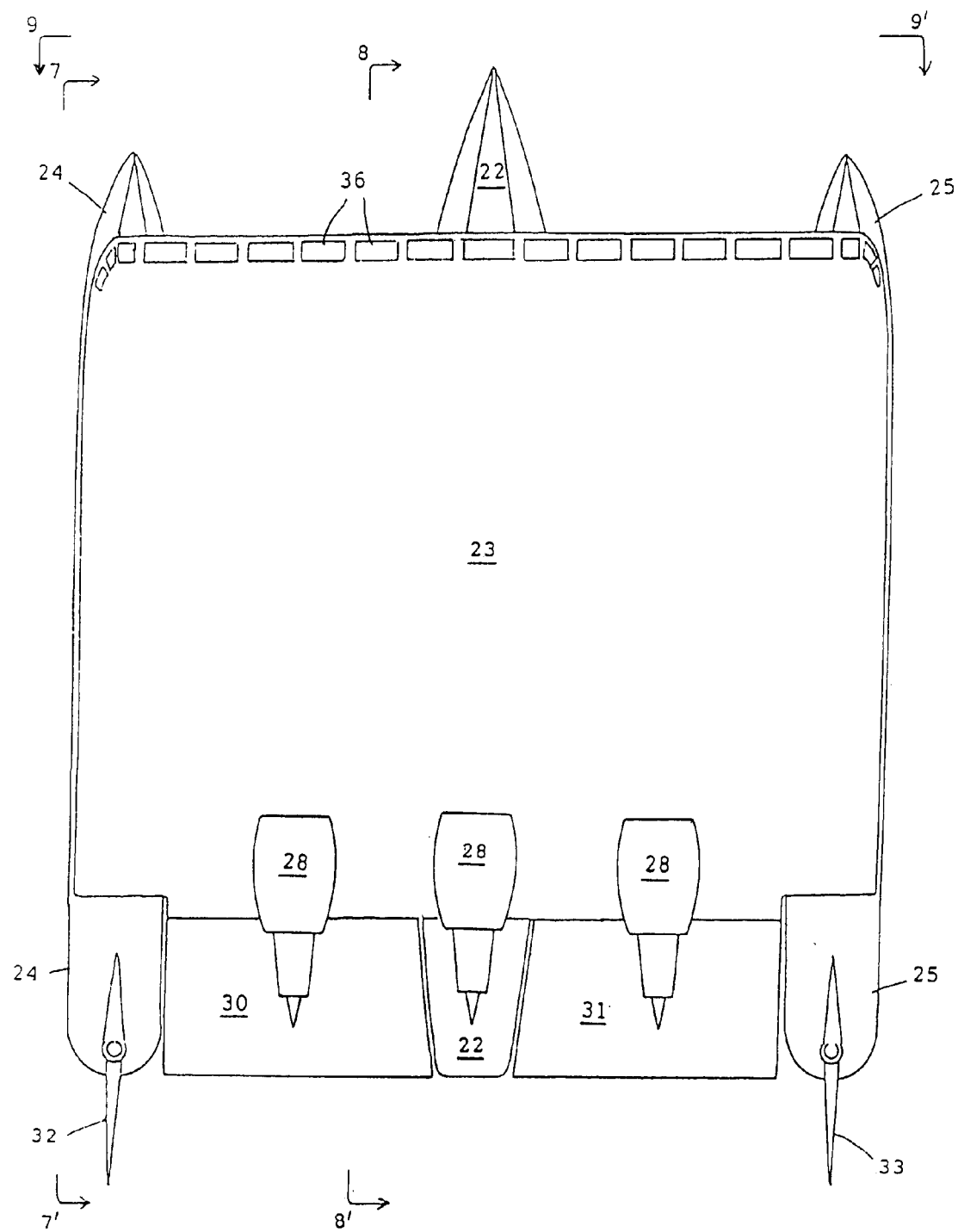
FIG. 6 is a top view of an alternative embodiment illustrating a much larger craft with three hulls (a trimaran) and multiple propulsion units.
Figure 7:
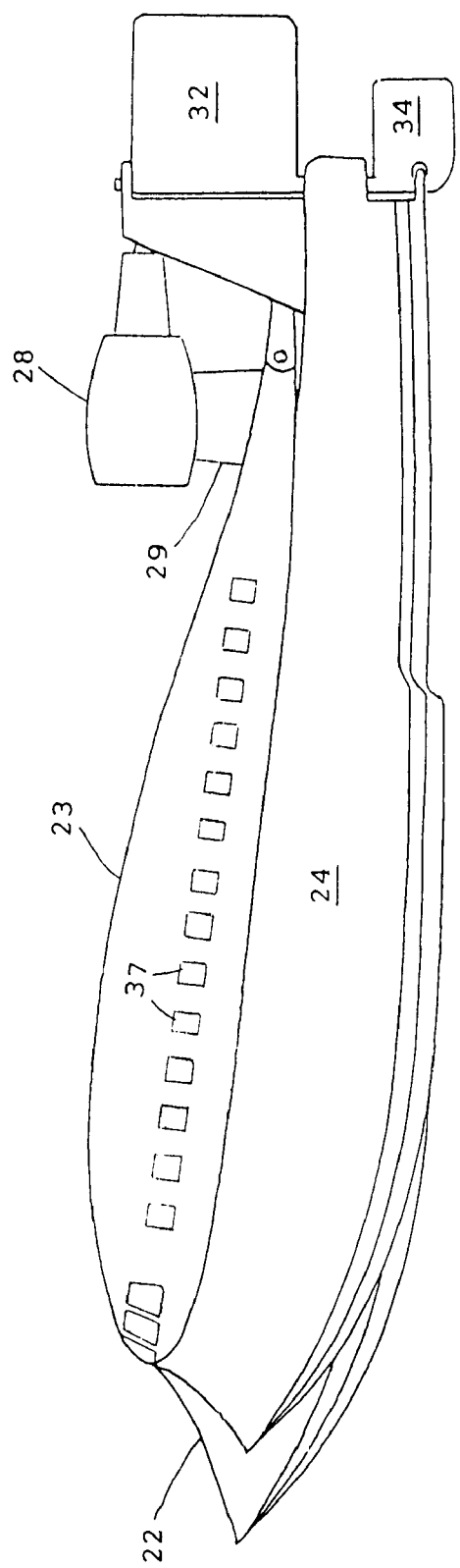
FIG. 7 is a left side view of the vehicle of FIG. 7 along line 7–7' of FIG. 6.
Figure 8:
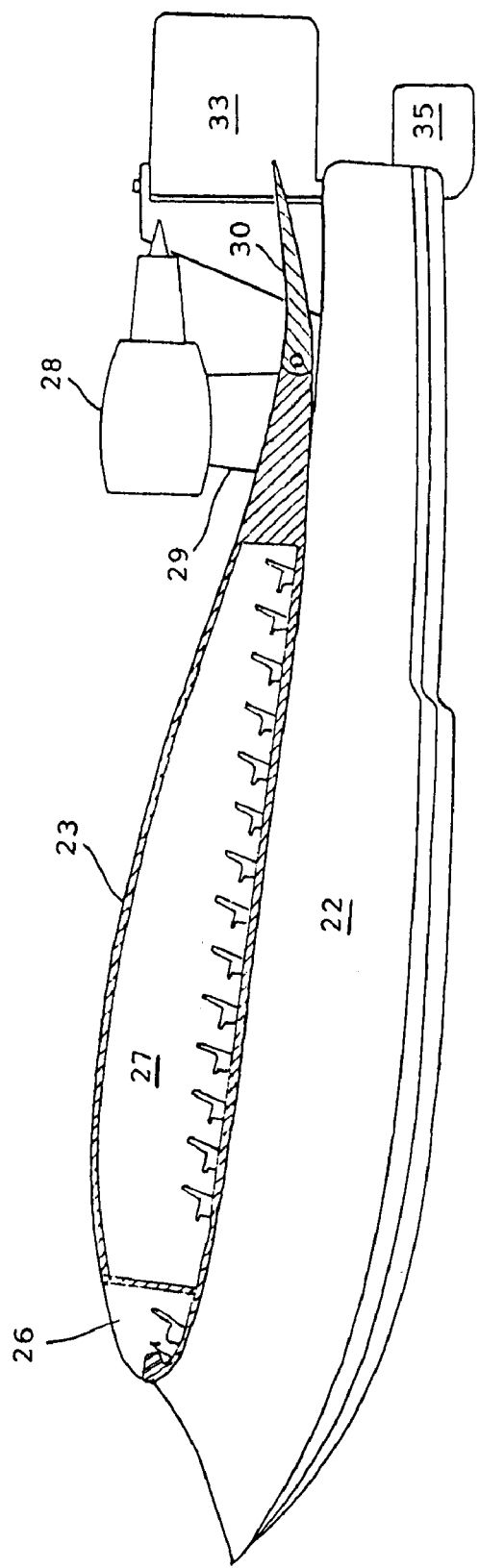
FIG. 8 is a left sectional view of the vehicle in FIG. 6 seen along line 8–8'.
Figure 9:
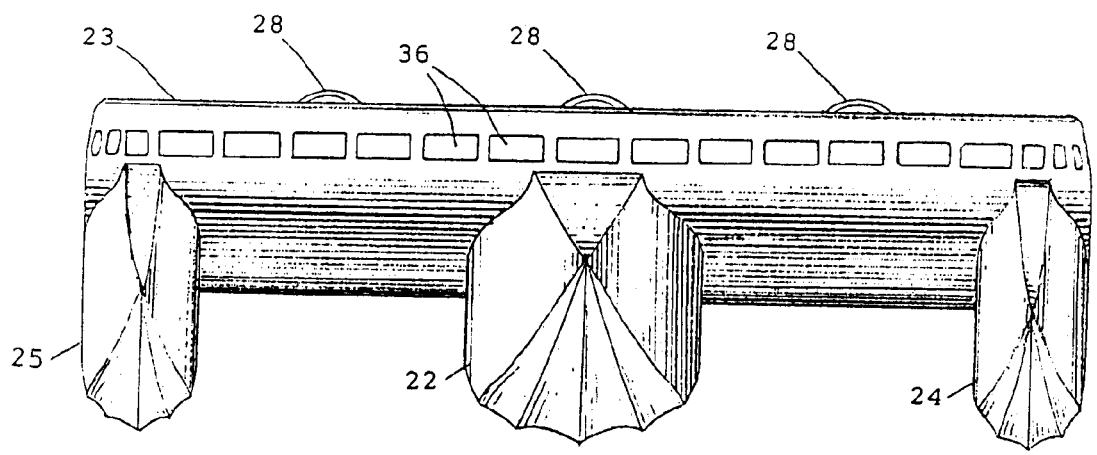
FIG. 9 is a front view of the vehicle in FIG. 6 seen along line 9–9'.

FIGS. 6, 7, 8 and 9 illustrate an alternative embodiment with three hulls (a trimaran) and multiple propulsion units suitable for commercial transport over seas and large lakes. It shows a fuselage 22 that is disposed in a lower position, thereby becoming a third hull. The vehicle is made large enough so that a unified bridge component 23, the left hull 24, the fuselage 22 and right hull 25 can accommodate cargo and passengers. This particular embodiment shows the pilot's cabin 26 and the passenger compartment 27 located within the bridge component 23. Propulsion is provided by three turbofan engines 28 anchored by pylons 29 to the fuselage 22 and the bridge component 23, as shown. Left elevon 30 and right elevon 31 function in the conventional manner as described hereinabove in the first embodiment. Left air rudder 32, right air rudder 33, left water rudder 34 and right water rudder 35 likewise function in the conventional manner. Windshields 36 shaped and set flush to conform with the airfoil configuration of the bridge component 23, and side windows 37 provide light and comfort to the passengers.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

What is claimed is:

1. An air-driven multi-hulled watercraft adapted to travel above the surface of a body of water in close proximity to said water surface, said watercraft having a vertical center plane of symmetry disposed upon a longitudinal axis extending between front and rear extremities of the watercraft, and further comprising:

a) at least two identical elongated hulls equally spaced apart in parallel relationship about said plane of symmetry and adapted to buoyantly support said watercraft when at rest upon said water surface, b) deck structure disposed between and secured to said hulls and defining with said hulls and water surface a channel through which air is compressively funneled with forward travel of said watercraft, c) a bridge component incorporated into said deck structure and bounded in part by upper and lower surfaces and leading and trailing extremities, said bridge component having an airplane wing airfoil configuration such that air which flows past said airfoil produces a low pressure zone at said upper surface, d) an elongated fuselage centered within said deck structure and extending between forward and rearward extremities, e) air-moving propulsion means associated with said deck structure behind said fuselage and having a thrust axis disposed above the upper surface of said bridge component, f) elevons movably attached to the trailing extremity of said bridge component for elevational control of the front extremity of the watercraft, and g) rudder means associated with the rear extremity of said watercraft for providing steering control of the watercraft when airborne and also when floating upon the water surface, whereby h) forward motion produced by said propulsion means causes said watercraft to become airborne above the surface of a body of water by virtue of both the aerodynamic surface effect produced by air passage through said channel and by the lifting effect produced by the airfoil-shaped bridge component, said watercraft having stability in said airborne state by virtue of the controlling effects of said elevons and rudder means and the location of said thrust axis.

2. The watercraft of claim 1 wherein said hulls extend between front and rear extremities, said front extremities being upwardly contoured so as to present a streamlined interception of said water surface.

3. The watercraft of claim 1 wherein said bridge component is comprised of paired bridge members, each disposed between said fuselage and a hull.

4. The watercraft of claim 1 wherein said leading extremity is positioned higher than said trailing extremity.

5. The watercraft of claim 1 wherein a passenger compartment is housed within said fuselage.

6. The watercraft of claim 1 wherein an engine compartment is housed within said fuselage.

7. The watercraft of claim 1 wherein said propulsion means is an air fan propeller.

8. The watercraft of claim 1 having two hulls.

9. The watercraft of claim 1 wherein said propulsion means is comprised of multiple propulsion units.

* * * * *